United States Patent
Burns et al.

(10) Patent No.: US 6,799,100 B2
(45) Date of Patent: Sep. 28, 2004

(54) PERMISSION SYSTEM FOR CONTROLLING INTERACTION BETWEEN AUTONOMOUS VEHICLES IN MINING OPERATION

(75) Inventors: Ray L. Burns, St. David, AZ (US); Vadim Parfenov, Tucson, AZ (US)

(73) Assignee: Modular Mining Systems, Inc., Tucson, AZ (US)

( * ) Notice: Subject to any disclaimer, the term of this patent is extended or adjusted under 35 U.S.C. 154(b) by 0 days.

(21) Appl. No.: 10/156,101

(22) Filed: May 28, 2002

(65) Prior Publication Data

US 2002/0143461 A1 Oct. 3, 2002

Related U.S. Application Data

(63) Continuation-in-part of application No. 09/571,495, filed on May 15, 2000.

(51) Int. Cl.$^7$ .............................. G06F 19/00; G06F 7/00
(52) U.S. Cl. ......................... 701/25; 701/202; 701/117; 701/301; 340/436; 348/119
(58) Field of Search ............................. 701/1, 23, 301, 701/300, 117, 202, 213, 200, 25; 340/988, 436, 903, 961; 348/113, 118, 119; 342/457

(56) References Cited

U.S. PATENT DOCUMENTS

| | | | | |
|---|---|---|---|---|
| 3,081,454 A | | 3/1963 | Gabelman et al. ............ | 343/6 |
| 5,546,093 A | * | 8/1996 | Gudat et al. ................. | 701/214 |
| 5,586,030 A | * | 12/1996 | Kemner et al. ............... | 701/23 |
| 5,629,855 A | * | 5/1997 | Kyrtsos et al. ............. | 701/300 |
| 5,923,270 A | * | 7/1999 | Sampo et al. ................ | 340/988 |
| 5,987,379 A | * | 11/1999 | Smith ........................ | 701/207 |

* cited by examiner

Primary Examiner—Thomas G. Black
Assistant Examiner—Ronnie Mancho
(74) Attorney, Agent, or Firm—Antonio R. Durando; Quarles & Brady Streich Lang LLP

(57) ABSTRACT

A supervisory safety-control system is implemented by dividing a mine's territory into zones of free operation ("permission zones") wherein a vehicle is allowed to move according to predetermined permission parameters but unhindered by other system constraints. Traffic of autonomous vehicles in each permission zone is controlled by the supervisory system in conjunction with and in addition to conventional safety constraints associated with the guidance system that effects the vehicle's tracking of predetermined trajectories. Permission zones are assigned and activated using criteria that ensure the vehicle will remain entirely within active zones so long as the vehicle acts within such predetermined permission parameters. Each permission zone is also associated with a maximum velocity profile that overrides guidance-system safety controls, if necessary, and ensures stoppage of the vehicle at the end of the permission zone.

12 Claims, 15 Drawing Sheets

PERMISSION SYSTEM FOR CONTROLLING INTERACTION BETWEEN AUTONOMOUS VEHICLES IN MINING OPERATION

RELATED APPLICATIONS

This application is a continuation-in-part application of copending Ser. No. 09/571,495, filed on May 15, 2000.

BACKGROUND OF THE INVENTION

1. Field of the Invention

This invention is related in general to autonomous vehicles and other equipment operating in a surface facility and, in particular, to a system for controlling the interaction among autonomous vehicles and between autonomous and manned vehicles to ensure safety and efficiency in a surface mine.

2. Description of the Related Art

It is known that traffic of manned or autonomous vehicles in a system can be controlled by tracking the position of each moving component in the system and by communicating with each vehicle from a central location, from a peripheral position, or directly from other vehicles, to guide the vehicle safely along a desirable course. Air-traffic control systems represent a good example of such an approach. The position of each aircraft is continuously monitored by one of many air-traffic control centers that is also in constant communication with the aircraft, ready to alert its crew of any impending danger or other situation deserving of attention. When the aircraft is unmanned, the communication includes control signals to an on-board computer that controls the flight of the craft through appropriate software and electronic and mechanical hardware. That is how an unmanned spacecraft is guided in flight. Thus, for the purposes of this disclosure, the term "autonomous" is intended to refer to the availability of either on-board or off-board supervisory systems for directing and/or controlling the movement of a vehicle.

Surface mines utilize a variety of work machines for excavating and transporting ore, grading and stabilizing roadways and slopes in the mine pit, and for providing all support functions necessary for the operation of a mine. Most work and haulage machines have been human-operated in the past, as mobile pieces of equipment constantly being maneuvered around the surface of the mine. Skilled operators ensure that each machine or vehicle is positioned in the right place and optimally oriented to perform its intended function while avoiding accidents and injury to people and property. In order to improve efficiency, much effort is currently under way to develop automated systems for controlling the operation of such work machines in surface mines and other similar environments.

Autonomous vehicles in a surface mine operation include mechanical hardware, a computer and appropriate software for implementing the various functions of the machine in response to control inputs provided by a control system. In a fashion similar to the guidance of unmanned aircraft, an autonomous vehicle can be monitored and guided by a central or satellite center transmitting control signals to the vehicle's on-board computer based on current mine conditions and in response to position data communicated by the vehicle. Knowing the current position of the vehicle with respect to known fixed obstacles and other mine equipment, the vehicle can be maneuvered to destination by the continuous control of its operating functions (for example, steering-wheel, accelerator and brake position of a truck). An on-board satellite-based positioning system (such as GPS) or an equivalent positioning unit (either of which can be supplemented with an inertial navigation system or the like) can be used to determine the current position of the vehicle, with an on-board transmitter/receiver unit to communicate with the control center, and on-board microprocessing and storage modules with appropriate hardware and software to effect the actual movement of the vehicle. Every operating function is manipulated to cause the vehicle to follow a predetermined course or set of courses modified according to current control instructions to meet particular up-to-date traffic conditions. Hazards can be avoided by implementing a predetermined control response when a hazard is identified by the system. For example, if a potential obstacle is detected within a certain distance of the vehicle being monitored, the course of the vehicle can be modified to avoid a collision.

This approach to traffic control has been found to be effective for systems operating at near steady state most of the time, just as in the case of airplanes that follow predetermined flight paths from a starting point to a destination. When rapidly changing conditions exist, though, such as within the traffic of a surface mine where multiple vehicles and other equipment cross paths and change direction and speed as required to perform multifaceted functions and to meet continuously changing optimal mine-operation alternatives, such a rigid, strictly reactive system of accident prevention is not adequate. A large degree of flexibility is required to distinguish between different kinds of hazards. For example, while an unidentified obstacle approaching a vehicle traveling at 30 miles per hour along a predetermined path on a mine road may warrant the immediate stoppage of the vehicle, the approaching of a known potential obstacle, such as another vehicle traveling in the opposite direction, may only require a reduction in speed and an additional precautionary adjustment, such as a shift to the appropriate side of the roadway.

In U.S. Pat. No. 5,629,855, Kyrtsos et al. describe a novel parabolic model and processing algorithm for predicting the path and updating the position of an autonomous vehicle based on a combination and filtering operation of previously acquired position values. In the course of explaining the invention, the patent describes many conventional features of autonomous-vehicle systems. For example, it discloses the use of travel-route components assigned to each vehicle to control its motion so as to conform to a target trajectory between locations. The routes are subdivided into segments or paths between fixed nodes along the target trajectories, and these segments are used to progressively effect the travel of the vehicle according to conventional motion-control techniques. Similarly in conventional fashion, typical operational constraints, such as speed limits, are associated with each segment for the performance of predetermined tasks in a safe and/or optimal manner by each vehicle along the assigned trajectories.

Commonly owned U.S. patent application Ser. No. 09/521,436, hereby incorporated by reference, describes a mine traffic and safety control system where the function of each autonomous vehicle is also performed according to a predetermined trajectory related to its particular task and implemented with on-board GPS and two-way communication hardware. The current position of the vehicle is continuously monitored and correlated to the position of potential hazards along its path, so that corrective action can be taken by implementing appropriate, predetermined control strategies. Each vehicle is assigned a "safety envelope" that allows for the vehicle's physical presence and operating tolerances. The safety envelope is characteristic of each vehicle and is defined by a variable space surrounding the vehicle wherein it may be physically present as it travels along its intended course. The shape and size of the safety envelope is dynamically varied to meet safety requirements for current course conditions facing the vehicle as it performs its autonomous function along its predetermined path. The safety envelope is changed according to a predetermined set of rules specific to the vehicle. Intersection locations among the various courses potentially followed by vehicles along roadways and other sites within the mine's property are established dynamically by monitoring current traffic conditions and identifying situations where the safety envelopes of vehicles traveling along approaching courses could overlap.

This concept of "safety envelope" superimposed over conventional notions of motion guidance over a predetermined travel trajectory is one component of a new approach to provide a mine traffic and safety control system capable of flexible, dynamic response. The present invention discloses another component in the implementation of such a system. The invention relates to the notion of subdividing the affected territory into zones of free operation, denoted permission zones, wherein each vehicle is allowed to move freely so long as it conforms to safety and other operational constraints pertaining to that zone. A permission zone always corresponds to a territory that is free of obstructions to travel, such that a vehicle can safely move anywhere within the zone, but it may or may not overlap a predetermined travel trajectory for the vehicle. Similarly, a permission zone may encompass portions of more than one trajectory; that is, alternative routes for moving an autonomous vehicle between locations. By assigning permission zones to autonomous vehicles, an additional layer of control is attained over the prior-art type of constraints imposed by conventional tracking systems and guidance algorithms, which are still also retained in the traffic system of the invention in order to guarantee absolute safety while ensuring optimal efficiency of operation. The invention is described in the context of a surface mine operation, but its concept is applicable to any operation involving moving equipment (such as waste sites, underground mines, quarries, warehouses, and the like), and should not be limited to surface mines.

BRIEF SUMMARY OF THE INVENTION

The primary, general objective of this invention is an independent and supervisory safety system, used in addition to conventional guidance and alarm systems and apparatus, for monitoring and controlling traffic in order to guarantee the avoidance of hazards by all autonomous vehicles and equipment operating at a surface mine.

Another general objective is an approach that permits the dynamic adaptation of safety and operational control rules to current circumstances facing a moving vehicle in a mine.

Another, more specific, goal of the invention is a system that provides an autonomous vehicle with an exclusive zone of free operation, so that the vehicle is allowed a predetermined operating space for carrying out its task in optimal fashion without interference from potential collision hazards independently of all other safety controls and/or constraints imposed by the vehicle guidance system.

Still another objective is an approach that is compatible with an overall hazard avoidance system that utilizes apparatus implementated through removable modules for each autonomous vehicle.

Another goal is a system that is suitable for automated implementation with current surface-mine haulage and mining equipment.

A final objective is a system that can be implemented economically according to the above stated criteria.

Therefore, according to these and other objectives, the broad embodiment of the present invention requires linking each autonomous vehicle and/or other moving equipment in a surface-mine facility to a control center for communicating data and control signals. Using on-board computer, GPS and two-way communication hardware, the function of each autonomous vehicle is performed through a conventional guidance system by causing the vehicle to follow a trajectory along a course or path related to its particular task. The current position of the vehicle is continuously monitored and correlated to the position of potential hazards along its path, so that appropriate traffic-control guidance can be implemented and corrective action can be taken, when needed, according to predetermined control strategies.

Specifically, one novel aspect of the present invention consists of dividing the mine territory into areas that contain parts of the mine open to traffic along each course potentially followed by a vehicle following an assigned trajectory. Each area is treated as an exclusive zone of free operation (defined as a "permission zone") wherein the vehicle is allowed to move according to predetermined permission parameters but unhindered by other system constraints and clear of other vehicles in the system. A permission zone is established dynamically as a function of the current position of all vehicles over the territory and according to criteria that ensure no collision can occur so long as each vehicle acts within such predetermined permission parameters. Before it can begin to move, each vehicle is assigned at least one permission zone (which therefore becomes an active permission zone) that includes the vehicle's current location and excludes the current location of all other autonomous vehicles in the system.

According to another aspect of the invention, each active permission zone (or sequence of permission zones) is associated with a permission parameter consisting of a maximum velocity profile that ensures stoppage of a vehicle prior to or at the boundary of the permission zone (or the end of the last active permission zone in a sequence of adjacent zones). In order to produce an efficient flow of traffic at maximum speeds, subsequent permission zones are assigned to a vehicle sequentially as early as possible and the velocity profiles are updated correspondingly on a current basis to allow full speed until the end of the last active zone. Successive permission zones along a predetermined course are assigned to a vehicle as soon as the position of all other vehicles and all other system constraints make them available.

Thus, according to the invention, vehicle traffic is first controlled by the current, ongoing assignment of active permissions zones, which are continuously monitored for availability on the basis of all other vehicles' movements and other operational constraints built into the system. The subsequent motion of each vehicle along its intended trajectory is advantageously controlled with the further assignment of permission zones, a feature that affords a real-time dynamic adjustment to varied traffic conditions and a corresponding degree of improved flexibility. By combining the allocation of active permission zones with conventional safety and guidance-control mechanisms associated with each travel trajectory, an additional layer of safety is superimposed over the overall traffic guidance system of the prior art.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose but one of the various ways in which the invention may be practiced.

DESCRIPTION OF THE PREFERRED EMBODIMENTS OF THE INVENTION

As used herein, the term "route" refers to one or more available paths between a starting point and a destination over a territory traveled by autonomous vehicles under the guidance and control system of the invention. The term "trajectory" of a vehicle is intended to mean a particular path assigned to and to be followed by the vehicle so that it can perform its intended travel task. Accordingly, a trajectory refers to the linear set of x, y, z positions to be followed by a reference point on the vehicle as it travels between different points along a route, which may or may not also include an origin and a destination. A trajectory may also refer to a corridor, rather than simply a linear path, in order to achieve particular operational goals, such as the avoidance of rut formation and the like. Trajectories may be combined to provide alternative guidance options to a given destination or to different destinations. The system's guidance and control apparatus ensures, using conventional methods, that each vehicle follows its assigned trajectory as it moves between locations.

The term "intersection" refers to any location where the separate trajectories of different vehicles come close enough that their safety envelopes, as this term is defined above, are projected to overlap. The term "switch" refers to separate travel trajectories that merge into a single one, or to a single trajectory that splits into multiple ones. The term "crossing" refers to separate trajectories that cross. For simplicity, switches and crossings are also referred to as intersections when they involve trajectories with safety envelopes projected to overlap. Moreover, it is understood that every reference to a vehicle in this disclosure is intended to apply as well to any other movable piece of equipment that may be found in a surface mine or other facility employing autonomous vehicles.

Figure 1:
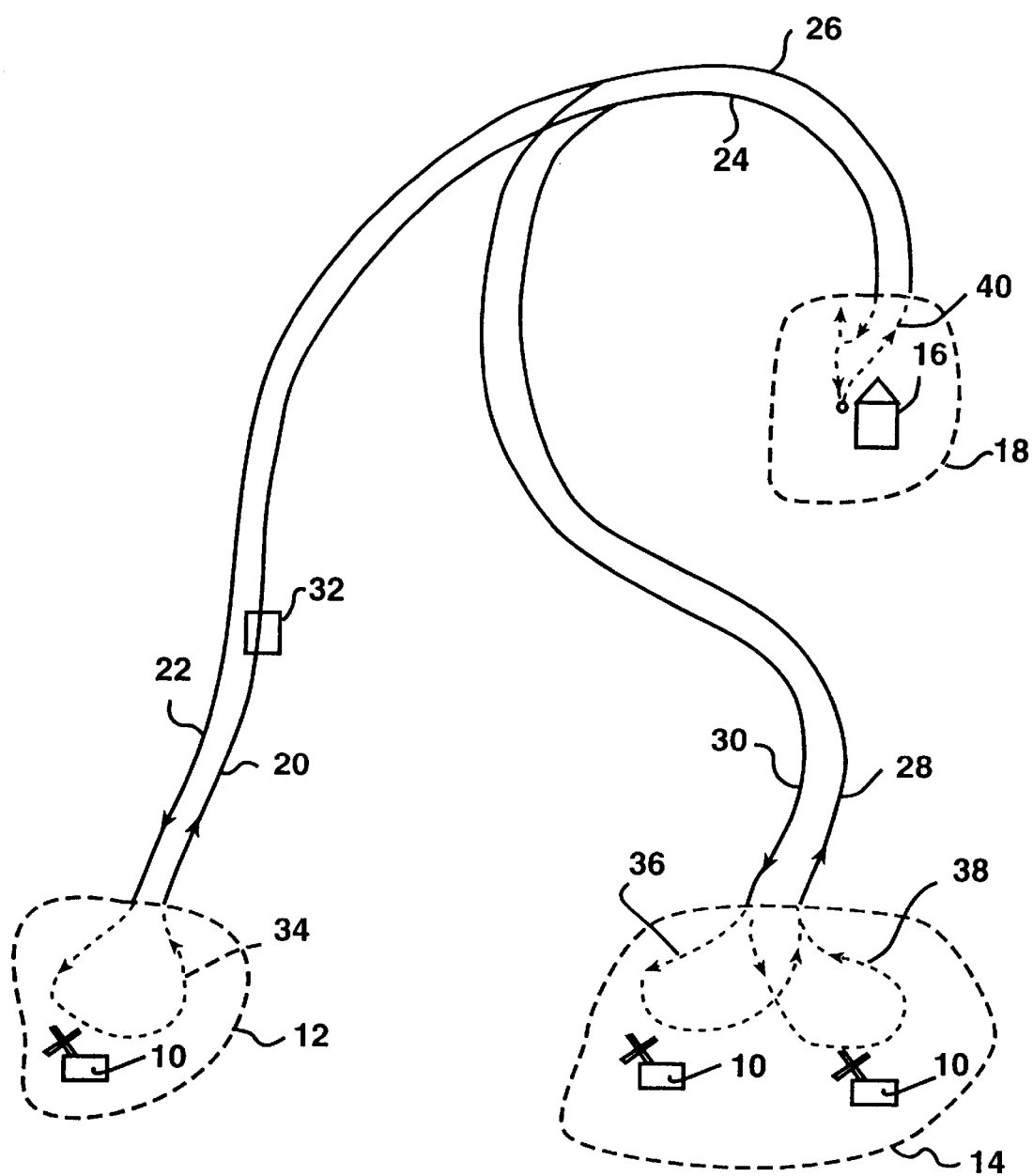
FIG. 1 illustrates in plan view a sample portion of a prior-art map of a surface mine property including routes between typical destination points.

Referring to the drawings, wherein like parts are designated throughout with like numerals and symbols, FIG. 1 illustrates in plan view a sample portion of a map of a surface mine property including exemplary routes between typical destination points. Excavators 10 are illustrated while mining at two sites 12,14 which are connected to a crusher 16 at a site 18 through mine roadways identified by predetermined vehicle travel trajectories 20,22,24,26,28,30. Each trajectory in the figure represents a predetermined optimal travel path along which an autonomous vehicle 32, such as a haulage truck, is guided between end destinations (12,14,18) by an autonomous guidance system in order to effect a particular task. Additional, alternative trajectories 34,36,38,40 are provided within the sites 12,14,18 to control the approach and departure of the vehicle 32 to and from the excavators 10 and the crusher 16. It is noted that the trajectories illustrated in the figures consist of linear paths, but could equivalently involve two- or three-dimensional space corridors around the linear paths connecting various parts of the mine, as mentioned above.

In essence, based on real-time vehicle-position data generated by an on-board GPS or other equivalent positioning unit and using known feedback-control servo mechanisms, the mine's autonomous guidance system controls the motion of the vehicle 32 by performing steering, braking, acceleration, and other functions so as to closely follow the trajectory of interest (i.e., the path delineated by the trajectory 20, in the case illustrated in the figure). Since present positioning systems have accuracies of the order of a few centimeters, it is possible to obtain very close adherence to the target trajectory. To that end, the pertinent trajectory (selected from the applicable trajectories 20–30), or portion of a trajectory, currently being traveled by the vehicle 32 is stored in the controller's storage unit of the vehicle's microprocessor and used as a target trajectory by the guidance system. Different trajectory geometries are approximated by mathematical models and implemented with conventional control algorithms. Note that these features are well known in the art and do not constitute a novel aspect of the invention. It is also noted that target trajectories may be completely predetermined or may be partly calculated "on the fly" as the need arises for a vehicle to proceed in a given direction. For example, upon being directed to move toward a destination, an on-board or a central computer may calculate the initial segment of a linear trajectory for the vehicle to follow taking into account various other constraints either communicated to or already stored in memory (such as spatial limitations for the trajectory, anti-rutting modifications to a straight trajectory, etc.).

Figure 2:
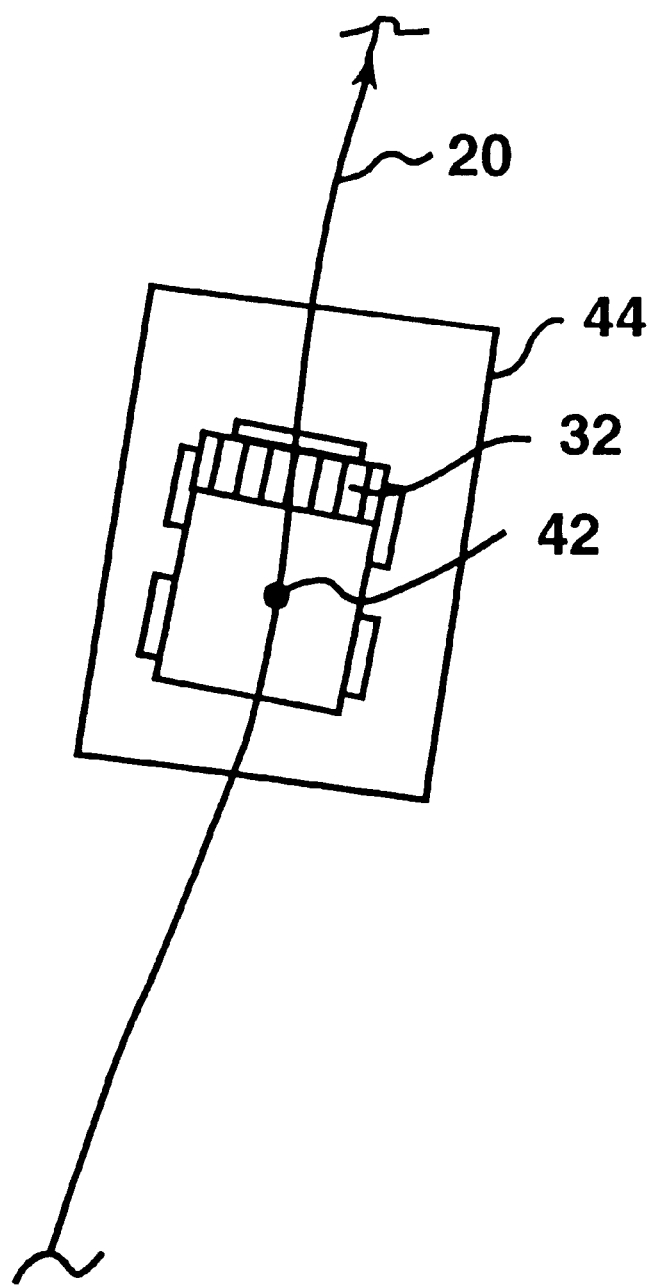
FIG. 2 illustrates schematically the selection of a reference point within a vehicle's physical structure to establish a nominal position for the vehicle within a selected coordinate system.
Figure 3:
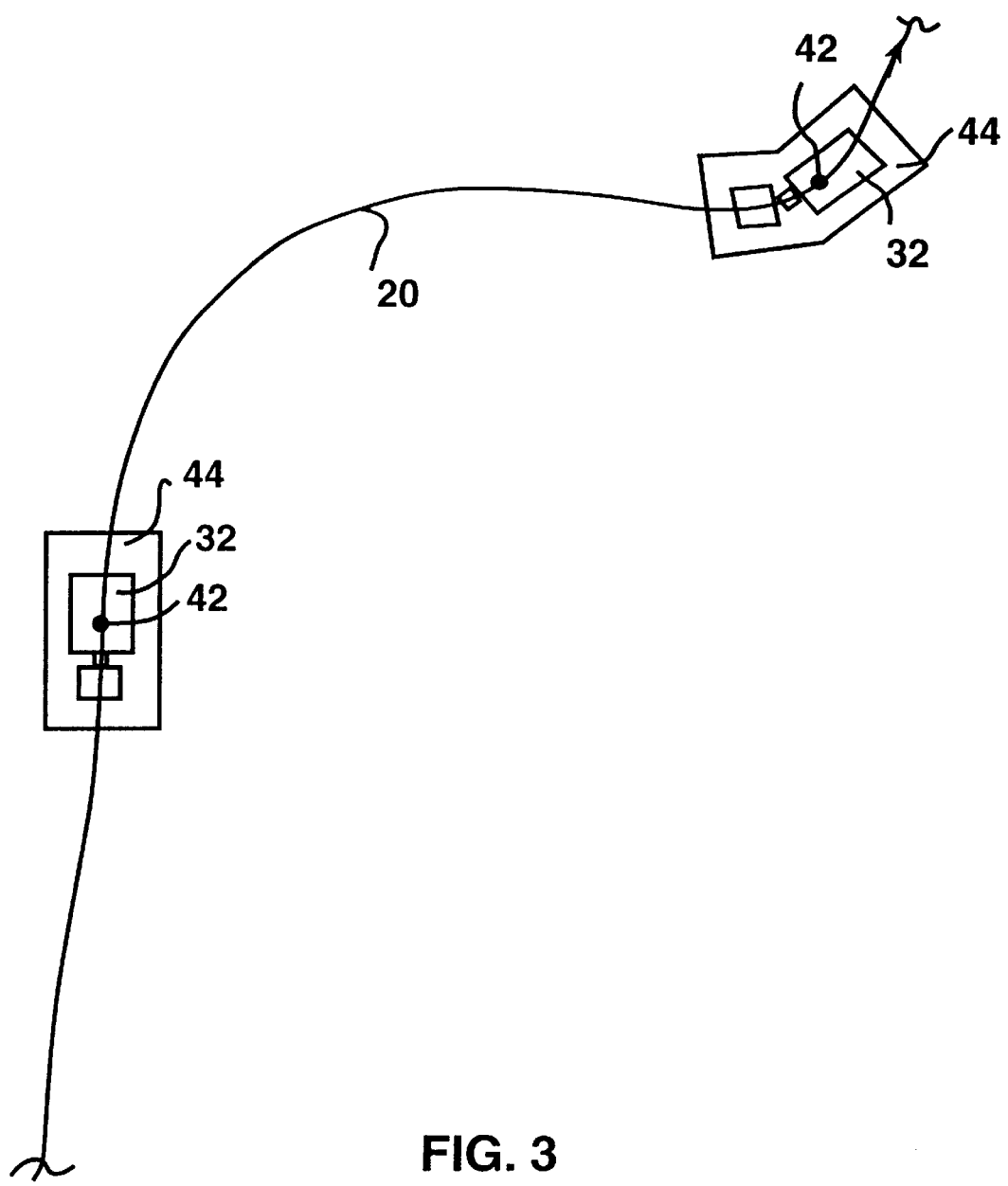
FIG. 3 illustrates schematically a vehicle consisting of two components connected by a swivel link and the corresponding safety envelopes for two different vehicle positions.

In practice, a nominal vehicle position within a selected coordinate system is chosen to correspond to the position of a reference point 42 within the vehicle's physical structure, such as its geometric center or the location of a communication antenna, as illustrated in FIG. 2, and the guidance system is programmed to cause that particular point to track the desired trajectory (path 20 in FIG. 1, for example). Obviously, though, the physical dimensions of the vehicle 32 extend beyond the point 42 and a correspondingly larger clear path along the trajectory 20 must be present as the vehicle passes through in order to avoid collisions with nearby obstacles. For example, the length and width of the vehicle 32 define its minimum physical operating space required when the vehicle is at rest. As the vehicle moves along the trajectory 20 under the control of the autonomous guidance system, additional factors must be accounted for to ensure safety, such as steering error, navigational guidance margins, and stopping distance variations due to load, equipment condition, road surface and grade, weather conditions, etc. Thus, the actual physical space required by the vehicle 32 to ensure its safe operation is greater than its size. In addition, some vehicles include multiple components connected by swivel joints or other links that permit the deformation of the vehicle's overall geometry, as illustrated in FIG. 3. These variables further contribute to the estimation of the space required by the vehicle to ensure its safe operation. The "safety envelope" concept disclosed in U.S. Ser. No. 09/521,436 addresses this problem by assigning to each vehicle a dynamically-updated space that defines the potential extension of the vehicle's physical structure at any given point along its trajectory.

Figure 4:
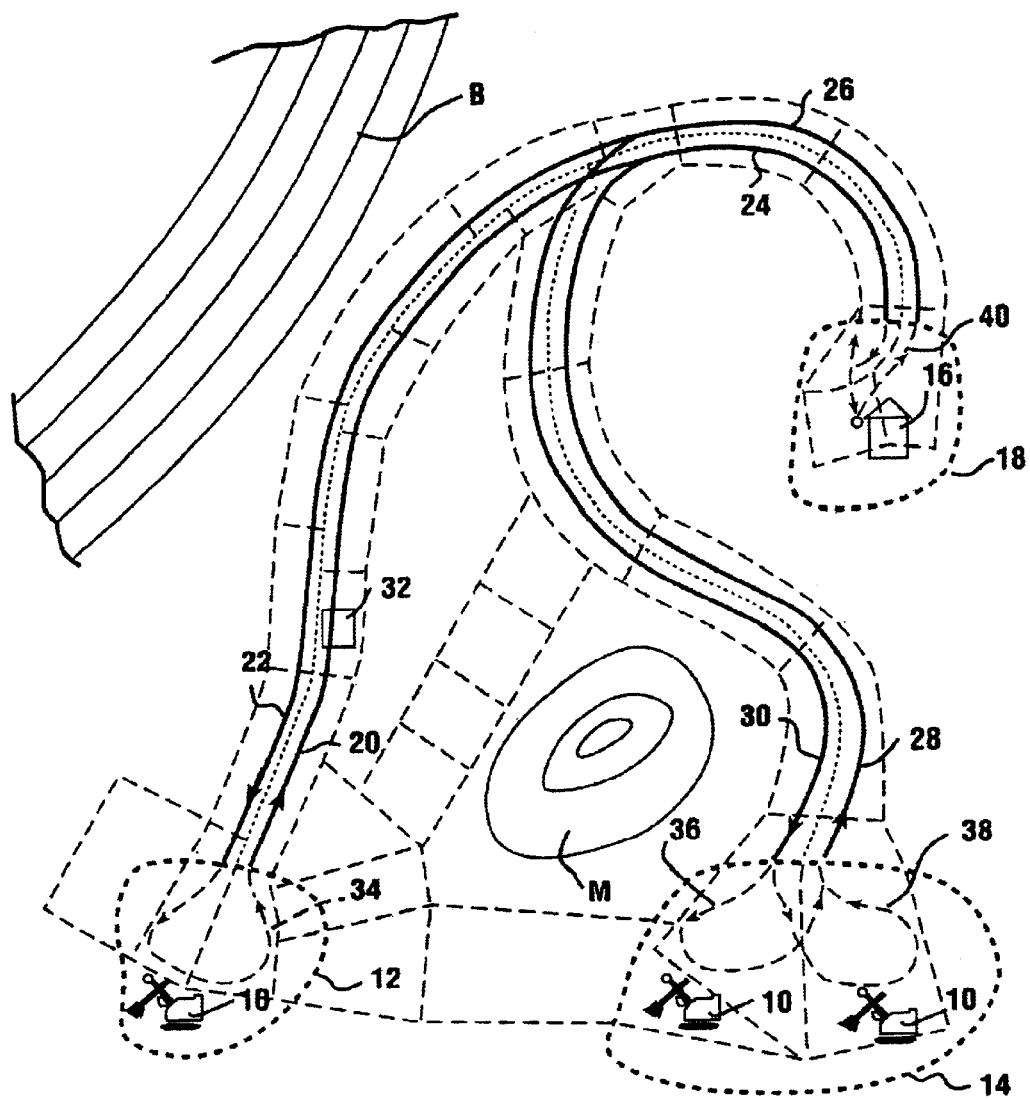
FIG. 4 is an illustration of a grid of permission zones superimposed over the trajectories of FIG. 1 and over open mine tory available for the development of new trajectories.

The present invention further expands on the idea of establishing additional layers of safety and control in an autonomous-vehicle guidance system by assigning to each vehicle a territorial zone within which it can operate freely and exclusively, subject only to predetermined permission constraints associated with that particular zone. To that end, the terrain of operation of the autonomous vehicles within the mine is divided into discrete, possibly overlapping, territorial portions (permission zones, as defined above) that encompass the territory and the trajectories available for moving autonomous vehicles within the site. FIG. 4 illustrates the concept with reference to the trajectories of FIG. 1 and other areas deemed available for traffic even though no trajectories have yet been defined through them. The figure also shows topographical sites occupied by a mound M and a berm B where no traffic can safely be allowed. Accordingly, each permission zone is either free of predetermined travel trajectories, includes at least a portion of a trajectory to be followed by a vehicle, or it includes segments from several trajectories traversing the zone. If more than one segment is encompassed, they may constitute alternative options to the same destination or trajectories to different locations. Regardless of these distinctions, each segment of trajectory in the zone, whether existing or later developed, would share the same operating constraints assigned to the permission zone.

Figure 5:
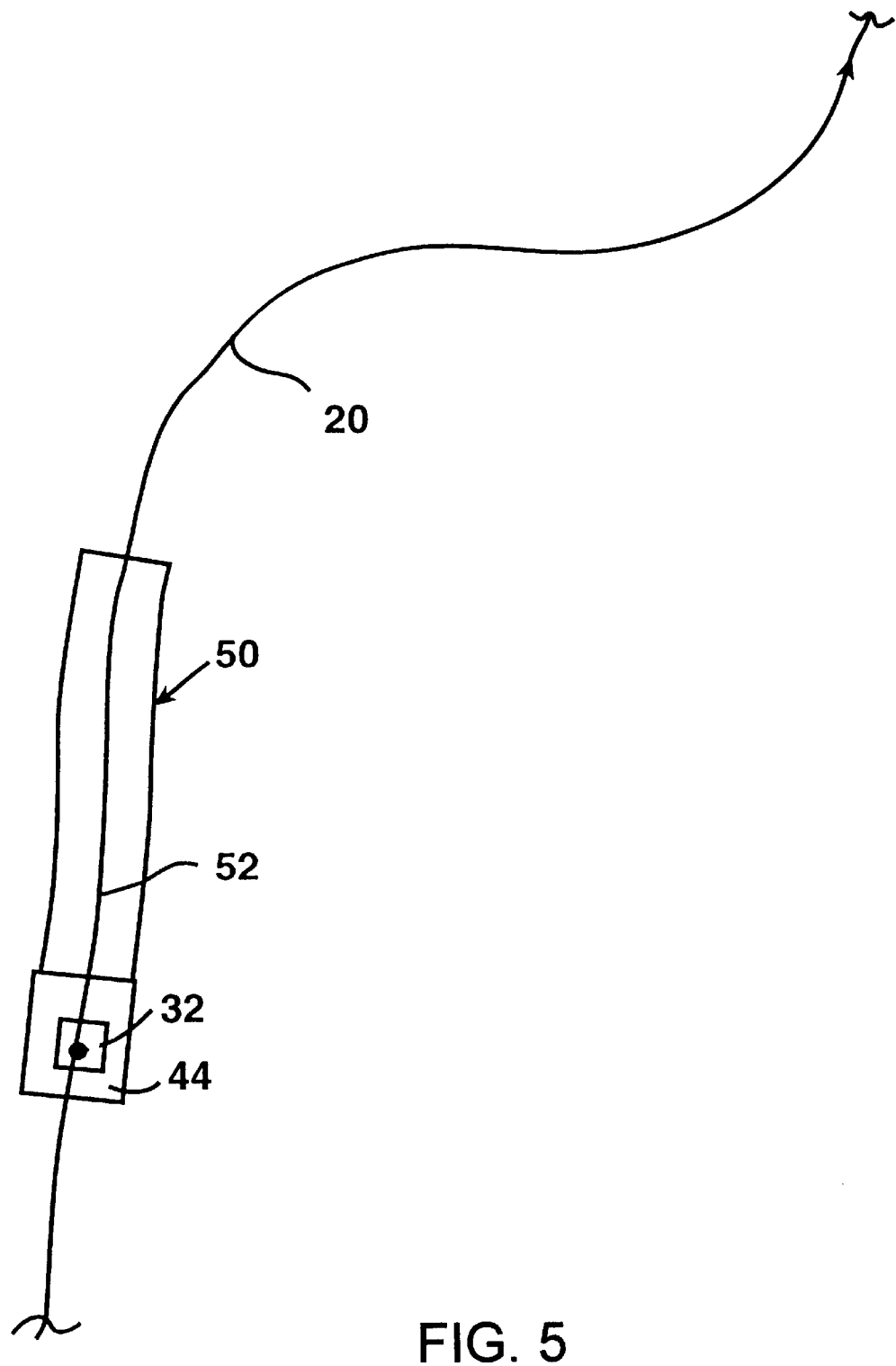
FIG. 5 illustrates the minimum size of a permission zone for a given segment of autonomous-vehicle travel route, as defined by the corridor spanned by the safety envelope of the vehicle as it travels along the planned trajectory along the route.
Figure 6:
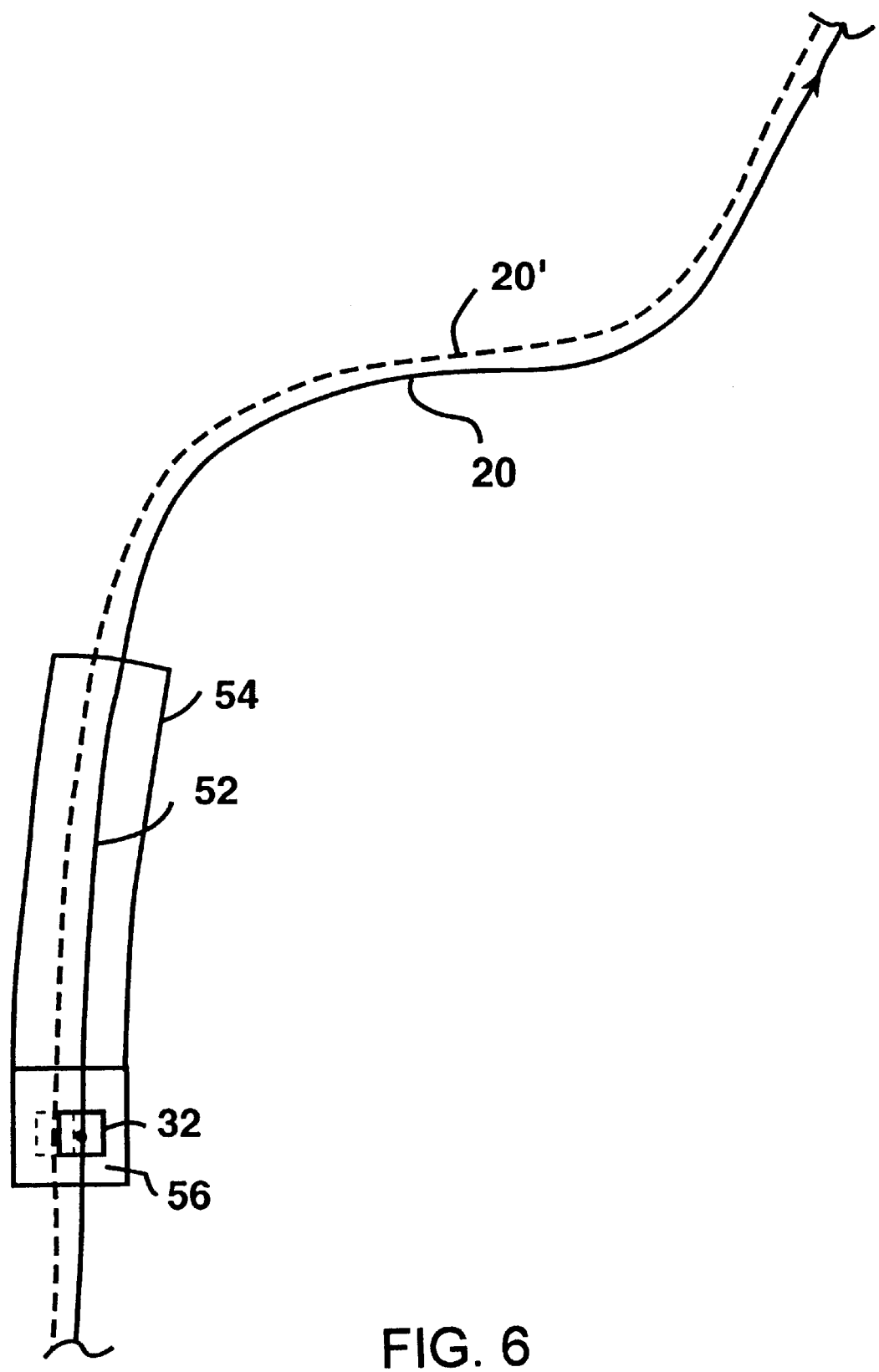
FIG. 6 illustrates a permission zone associated with a safety envelope that has been enlarged to account for guidance control applied to minimize rutting, thereby causing the vehicle to be guided along a modified, wider path defined by a corridor between the original trajectory and the anti-rut trajectory imposed by the guidance system.
Figure 7:
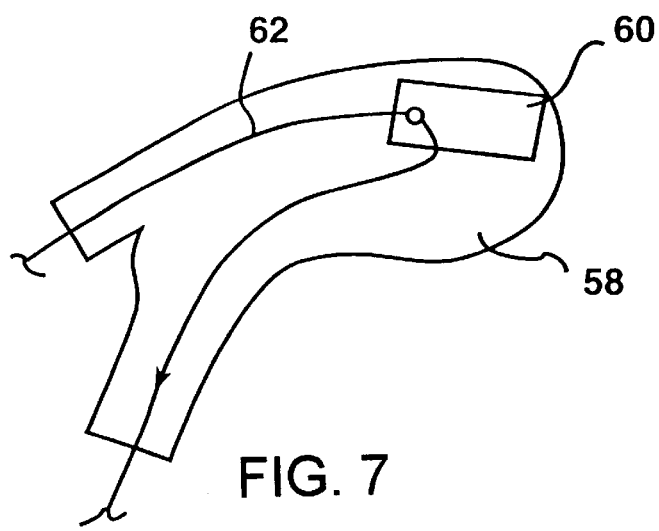
FIG. 7 illustrates a permission zone defined by the span of the safety envelope of a vehicle traveling along a relatively sharp turn of a trajectory segment.

Permission zones may be assigned alone or in sequences, with or without conditions, contiguous or disconnected. When a permission zone (or sequence of contiguous zones) is assigned without conditions, it becomes "active" and the vehicle is thereby authorized to move anywhere within the zone, along any existing segment of trajectory or along any new segment of trajectory developed after assignment of the permission zone on the basis of particular instructions and constraints applicable at the time of the assignment. Of course, vehicle travel along any such trajectory is also conducted according to a predetermined control protocol imposed by the guidance system (that is, the vehicles are guided automatically by the autonomous control system, which is used in conjunction with but is separate from the permission zone concept of the invention). The size of each permission zone, which may be variable or fixed, and the assignment and activation of consecutive permission zones are selected so as to ensure that no collision can occur within the assigned zone (or zones) when a given vehicle is authorized to follow or develop a trajectory segment contained in the zone (or zones). Accordingly, as illustrated in FIG. 5, the minimum size of a permission zone 50 is necessarily defined by the corridor spanned by the safety envelope 44 of the vehicle 32 as it travels through the authorized trajectory segment 52. Similarly, FIG. 6 illustrates a permission zone 54 associated with a safety envelope 56 that has been enlarged to account for guidance control applied to minimize rutting, thereby causing the vehicle 32 to be guided along a modified, wider path defined by the corridor corresponding to the original trajectory 20 and the anti-rut trajectory 20' superimposed on it (an alternative possible position of the vehicle 32 is shown in phantom line for illustration). FIG. 7 illustrates a permission zone 58 that encompasses the span of the safety envelope 60 of a vehicle traveling along a relatively sharp turn of a trajectory segment 62. Other permission-zone shapes and sizes can obviously be designed, as illustrated in FIG. 4, to correspond to the shape of the work area and corresponding trajectories needed for a particular task of the vehicle being controlled, such as polygonal or B-spline shapes for work conducted at loading sites and the like.

Figure 8:
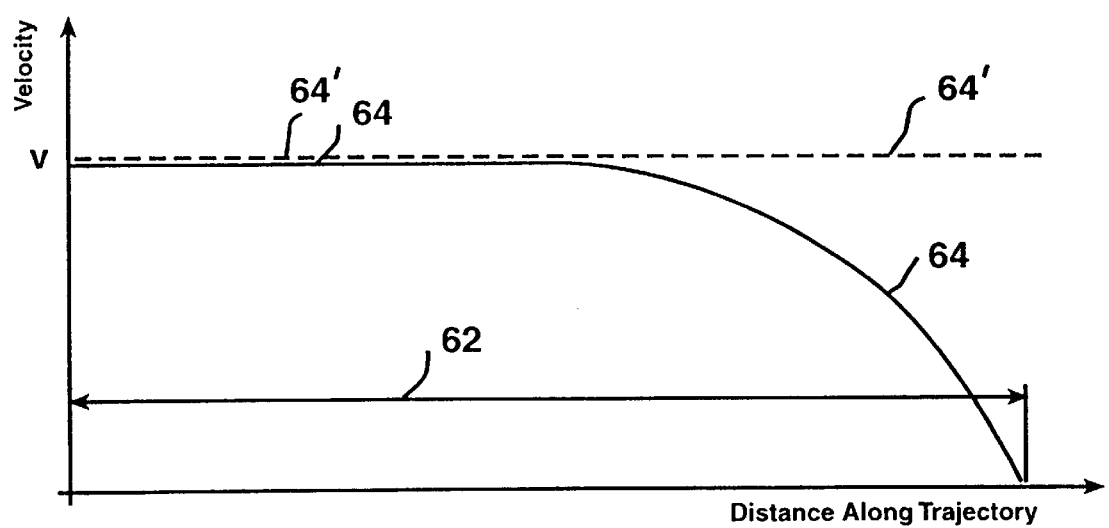
FIG. 8 illustrates an exemplary velocity profile associated with a permission zone or sequence of permission zones.

The forward extent of a permission zone or sequence of zones is determined according to a preselected permission criterion (or more than one), such as a safety criterion that ensures no collision will occur if the autonomous vehicle operates within the constraints associated with the particular zone or sequence of zones. For example, a preferred constraint is a profile of maximum velocity at which the vehicle is allowed to travel within the zone, and a preferred safety criterion is a terminal portion in the profile to ensure a complete stop of the vehicle before it reaches the boundary of the zone. FIG. 8 illustrates an exemplary velocity profile 64 that might be appropriate for the trajectory segment 52 of the permission zone 50 of FIG. 5. As shown, v is the initial maximum velocity allowed the vehicle 32 while traveling along the segment 52 of the trajectory 20. When the permission zone 50 is assigned to the vehicle 32, the vehicle is thereby given permission to travel at the maximum velocity defined in the figure by the profile 64 as a function of position within the segment 62, which includes a terminal portion that forces the vehicle to stop unless the profile is modified by a subsequent control signal. This constraint is imposed even though the terrain of the course and other considerations might have justified a greater maximum speed, such as illustrated by the extended curve 64' in FIG. 8. Thus, a preferred safety criterion for setting the extent of a permission zone or sequence of zones is a distance sufficient for a vehicle to stop from any given point in the last active zone while traveling at the maximum speed imposed by the velocity profile. In fact, the vehicle may be traveling at a lower speed than allowed by the profile because other, unrelated constraints have been imposed on it while it is traveling through the zone, such as a deceleration command in response to the sudden appearance of an unexpected obstacle (i.e., a loose animal) within the permission zone.

Figure 9:
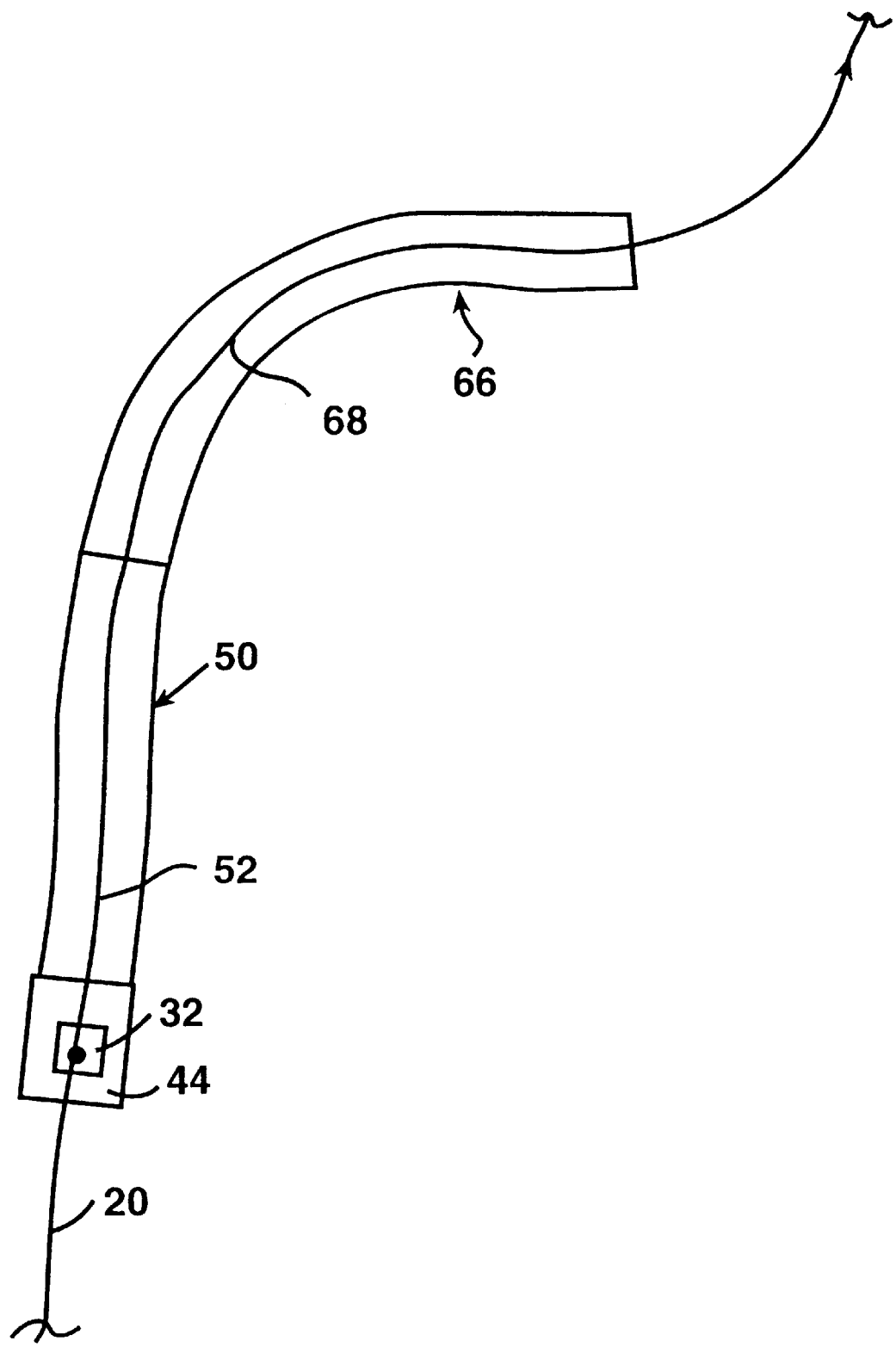
FIG. 9 illustrates the autonomous-vehicle travel route of FIG. 5 with an additional permission zone attached to the first active segment.
Figure 10:
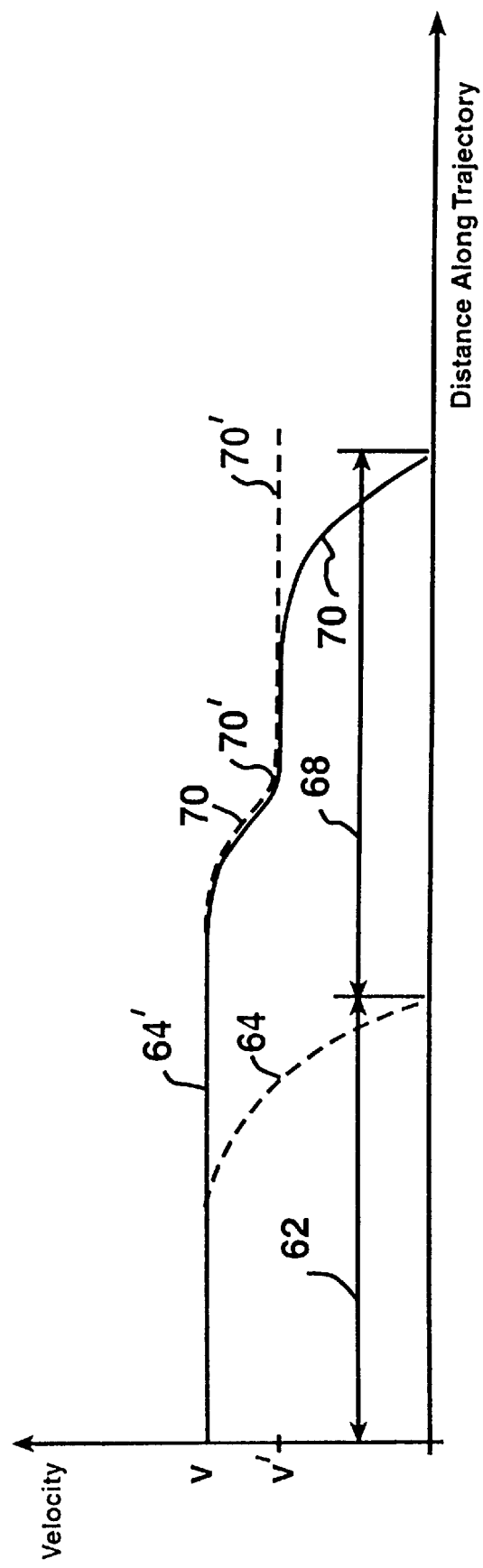
FIG. 10 is the velocity profile of FIG. 8 expanded to include the velocity profile associated with the additional permission zone attached to the first active segment, as shown in FIG. 9.
Figure 11:
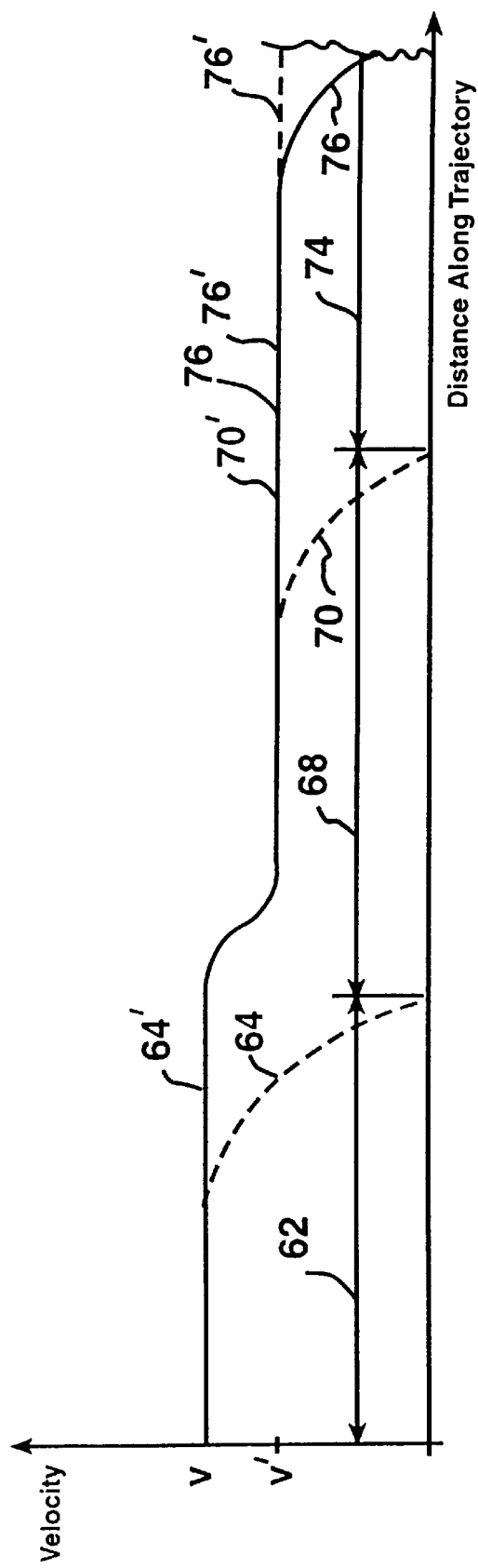
FIG. 11 is the velocity profile of FIG. 10 further expanded to include the velocity profile of yet another permission zone, as shown in FIG. 12.
Figure 12:
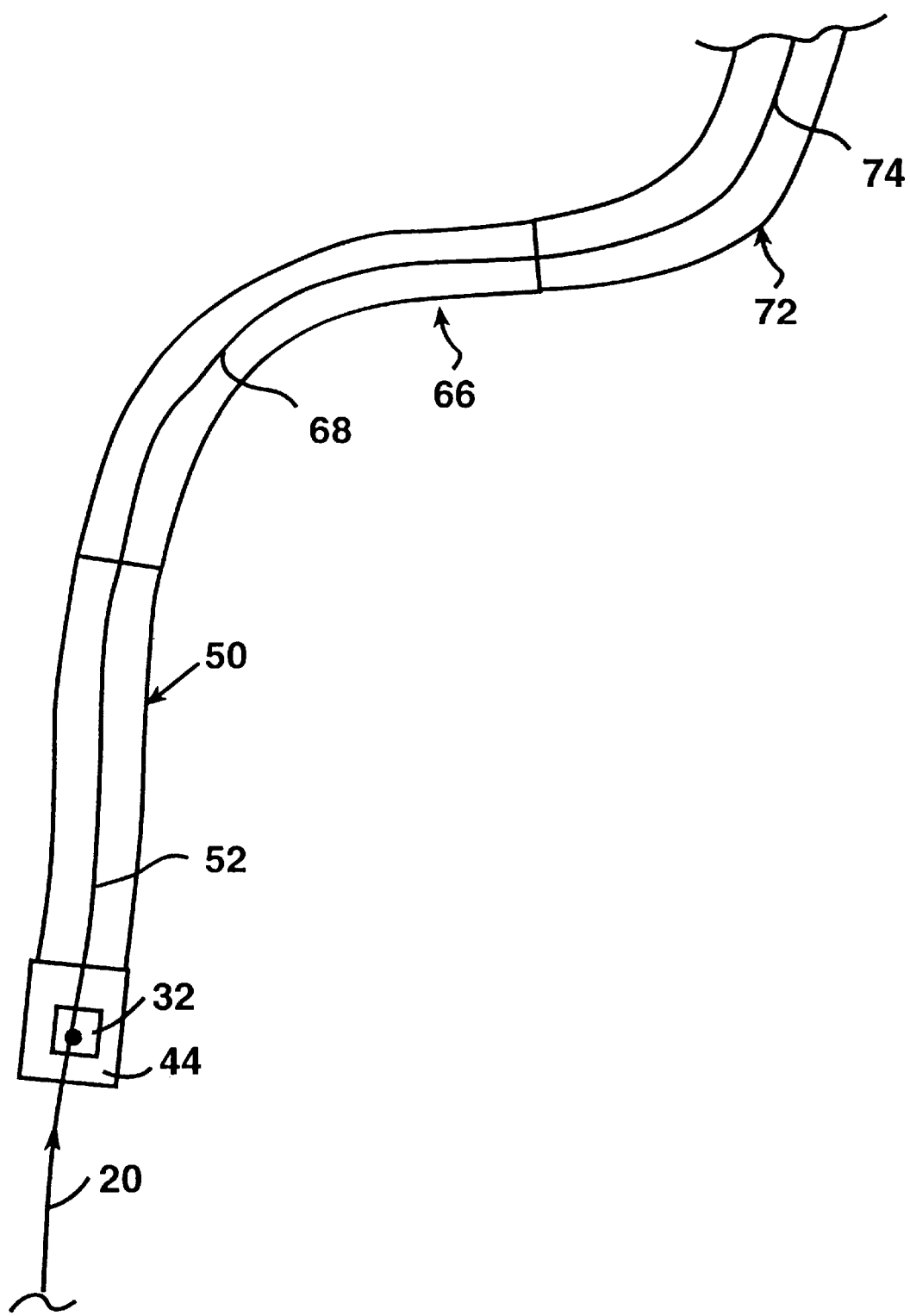
FIG. 12 is the travel route of FIG. 9 further expanded to include yet another permission zone.

In practice, successive permission zones are assigned (that is, "permissions" are given) to each autonomous vehicle in order to maintain operation at maximum efficiency and prevent unnecessary stoppages between segments of a traveled trajectory. When a sequence of active permission zones is assigned to a vehicle, the corresponding velocity profile is calculated based on assuring that the vehicle will stop within the limits of the last zone in the sequence. According to another aspect of the invention, the terminal safety portion of the velocity profile associated with an active permission zone or zones (the term "active" is used to refer to a permission zone or a sequence of permission zones assigned to and open to travel by a vehicle) is raised immediately after a subsequent adjacent permission zone (or zones) becomes available and is assigned and activated. The new profile is preferably selected to match the maximum velocity 64' that would have been desirable without taking into account the safety criterion. Thus, for instance, upon assignment of a new, adjacent permission zone 66 to the vehicle 32 of FIG. 5 (shown in FIG. 9) corresponding to the next segment 68 of the trajectory 20 to be traveled by the vehicle, the velocity profile associated with the active zone 50 is changed to allow maximum speed throughout, as shown in FIG. 10. Note, as an example of a typical situation, that the velocity profile 70 associated with the new permission zone 66 reflects a reduction in maximum speed to a lower level v' because its trajectory segment 68 is curved, thereby warranting slowing down regardless of the safety criterion. At the same time, the profile 70 also provides for a complete stop unless a subsequent permission zone is first assigned to the vehicle 32 and the profile 70 is again modified as described to match its unconstrained level. FIG. 11 illustrates the resulting velocity profile imposed on the vehicle 32 after yet the next permission zone 72 is assigned to it, which is partially shown in FIG. 12 with reference to the next segment 74 of the trajectory 20. As for the two previous permission zones, the velocity profile 76 for zone 72 includes a safety decline portion to be followed unless modified by the system. Note that the composite velocity profile illustrated in FIG. 11 can be assigned, and normally would be, to the vehicle 32 while it is still within the active permission zone 50, so that the safety decline portions of the various velocity profiles, hopefully including all subsequent safety declines as well, would be overridden by the guidance control system and become inoperative, as illustrated by the phantom-line notation used in the figure. If, on the other hand, a subsequent permission zone cannot be assigned to a vehicle currently moving in an active permission zone, the system will impose the safety-decline portion of the velocity profile until the adjacent permission zone becomes available. It is understood that a vehicle must always have active permissions that cover its current position (even when the vehicle is idle) and, if moving at a given speed, the worst-case stopping distance necessary for it to come to a halt from that speed.

Figure 13:
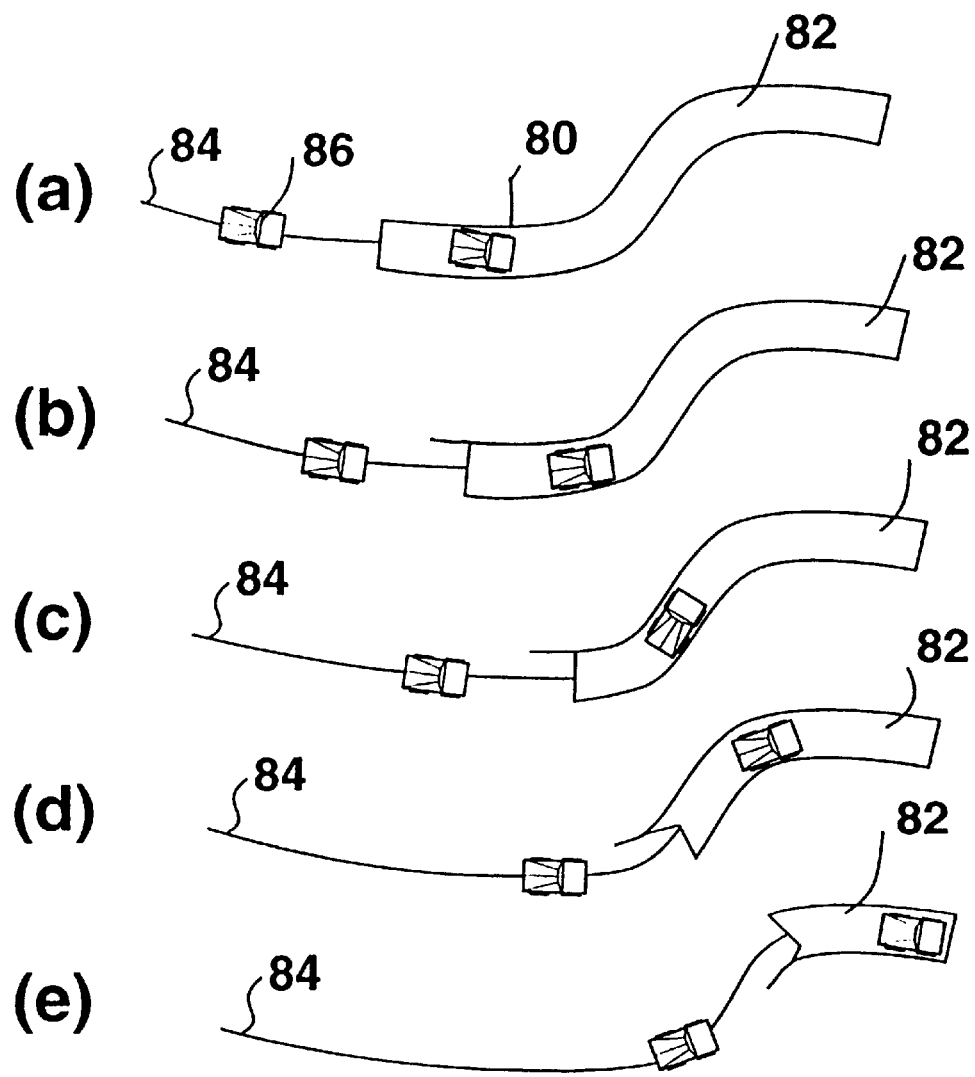
FIG. 13 illustrates a sequence of conditions (a–e) occurring as a truck in an active permission zone is followed by another truck along a given route and the permission zone is progressively reduced by the release of the portions surpassed by the first truck.

The protocol for the assignment of active permissions to a vehicle in the system is based on an assessment that no other vehicle will be contemporaneously present within an active zone. Therefore, the permission zone (or the sequence of permission zones) assigned to a particular vehicle remains so dedicated until released. Thus, for the purpose of efficiency, a permission zone should be released as soon as possible while the vehicle to which it is assigned passes through. According to a particular embodiment of the invention, the portion of a permission zone that has already been traversed by its assigned vehicle may be immediately released for use by another vehicle, subject to the same type of velocity and safety constraints illustrated above, either for the same trajectory or for another, intersecting trajectory. For example, FIG. 13 shows a truck 80 in an active permission zone 82 along a trajectory 84; another truck 86 follows. The figure illustrates a sequence of conditions (a–e) occurring as both trucks advance along their predetermined trajectory 84 and the permission zone 82 is progressively reduced by the release of the portions surpassed by the truck 80. At the same time, the released portions become available for assignment to the truck 86 so that it can continue advancing at a safe distance without unnecessary delay. Note that the permission zones assigned to the truck 86 are not shown in the figure, but it is understood that the truck would only be able to progress through such assigned zones in the way explained above.

Figure 14:
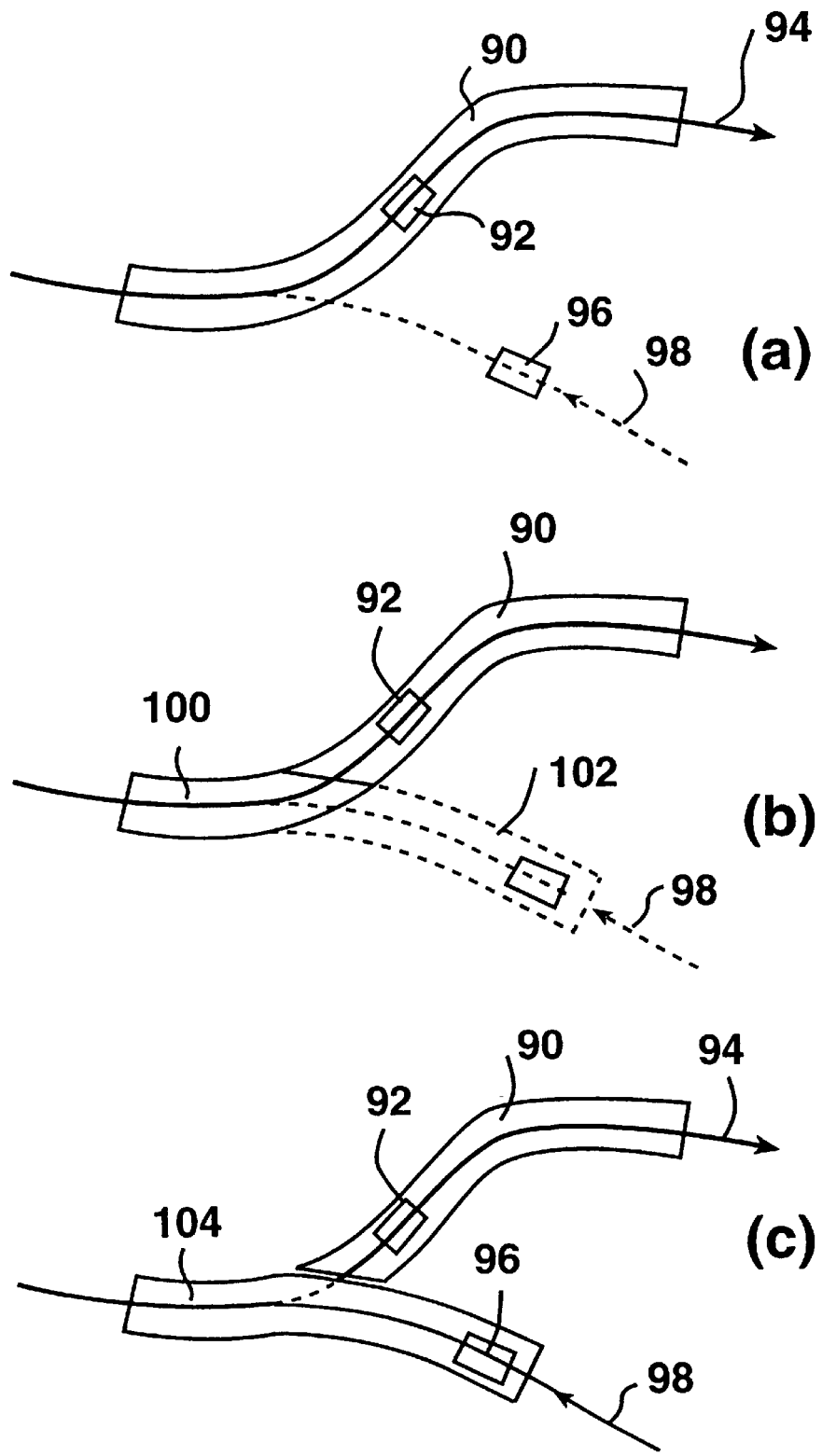
FIG. 14 illustrates another example of the release of a portion of an active permission zone where it is then coupled to an intersecting course, so that traffic at an intersection is not unduly delayed.

FIG. 14 illustrates another example of the release of a portion of an active permission zone where it is then coupled to an intersecting trajectory, so that traffic at an intersection is not unduly delayed. The first permission zone 90, assigned to truck 92 traveling along a first trajectory 94, is severed to accommodate another truck 96 waiting to progress along an intersecting trajectory 98. See FIG. 14(*a*). The severed portion 100 is released by the truck 92 and connected to another zone 102 available along the trajectory 98 to provide a new active permission zone 104 for the vehicle 96.

In a similar way, active permission zones already assigned to a vehicle along a course to be traveled may be relinquished if changed circumstances warrant. For example, assume that a first vehicle has already been assigned a sequence of active permission zones along a trajectory when the system determines that an intersection involving one such zone exists with the trajectory followed by a second vehicle. Then, based on predetermined optimization criteria dictated by operational needs, the system could ask the first truck to temporarily relinquish the section of permission zone containing the intersection to the second truck, so that it may cross first in order to improve efficiency of operation. Of course, that would occur only if the velocity profile being followed by the first truck could be modified in time to allow it to operate safely without the active availability of the relinquished zone. In such case of relinquishment, the relinquished permission zone would then be reassigned as active to the first truck as soon as traffic warranted.

Thus, the implementation of the invention provides dynamic assignment and relinquishment of permission zones that may also have variable sizes dependent on system needs. In a most general sense, each active permission zone or sequence of zones could be treated as consisting of an integral of minute segments of territory periodically allocated to or released from the zone, thereby providing to each vehicle in the system a substantially continuous zone of free operation bounded only by the first next segment where a potential hazard is identified.

As one skilled in the art would readily understand, the general concept of the invention can be implemented in various ways based on different design choices. For example, as a matter of practical system design, it may be desirable to select areas with fixed dimensions as permission zones available for assignment to the various vehicles traveling through the system. Similarly, appropriate velocity profiles may be assigned to each permission zone with a fixed safety decline profile applicable to all zones. Also, a fixed shape and size may be selected for each permission zone regardless of the vehicle to which it is assigned. Obviously, though, in such a case the zone must be sufficiently large to accommodate the safety envelope of the worst-case vehicle (for example, a larger vehicle is likely to occupy a larger area than a smaller vehicle). When an approaching intersection or switch location is identified on the basis of potentially overlapping safety envelopes between approaching vehicles, active permissions are assigned to only one of such vehicles, so that collisions are prevented while efficient traffic is maintained. Preset, arbitrary control-protocol permission rules must be implemented according to a predetermined logic of operational preferences (e.g., loaded trucks may have precedence over other vehicles).

Note also that a vehicle may be assigned sequences of active permission zones along alternative courses leading to the same or different destinations. In such an event, as the vehicle approaches a switch point, the system would determine the optimal course for the vehicle to follow and relinquish the permission zones along the alternative unused courses. This level of flexibility enables the dynamic optimization of traffic conditions simply by controlling the assignment of permission zones. It is noted that this is accomplished separately from and without affecting the normal control protocols of the guidance system in place to guide the vehicles along selected travel trajectories.

The invention is based on the idea of providing each moving vehicle with a zone of free operation as a first layer of traffic control to ensure the safety of all vehicles in the system. The next layer of safety control lies with the conventional constraints imposed by the guidance system, whereby the autonomous functions of the vehicles are carried out as programmed with the additional layers of controls ordinarily present to ensure safety and efficient traffic flow (for example, additional layers of safety mechanisms may superimpose particular operating constraints that are not pertinent to the present invention). In essence, in addition to the concept of safety envelopes disclosed in U.S. Ser. No. 09/521,436, the permission zones of the present invention constitute another piece of collision-avoidance strategy that assures safety at switching and intersecting locations, and allows dynamic optimization of traffic alternatives both locally (within each permission zone) and globally over the mine site. Safety envelopes are used to compute the range of possible sweep of a vehicle traveling in the system. Permission zones, which are computed to include at least such range of motion, provide a mechanism for allowing a vehicle to move (according to predetermined rules) along a segment of a target trajectory once the system determines that no possibility of collision exists along that segment.

It is important to note that the permission zones of the invention consist of a grid of territorial chunks overlaying the traversable areas at the mine site and including all trajectories programmed into the traffic-guidance system, as distinguished from the trajectories themselves which are defined and tracked by conventional methods. As illustrated by the Kyrtsos et al. disclosure, traffic trajectories are conventionally modeled with discrete geometric components pieced together to form travel segments between locations, wherein each component may be assigned a maximum travel speed related to safety considerations. Conventional guidance systems typically also ensure that a sufficient travel distance is available at all times along a trajectory for a vehicle to stop from a maximum allowed speed, so that the vehicle can be guided to a stop in case a safety condition requires it. The present invention, on the other hand, associates a speed profile with each permission zone that includes a maximum speed through the zone and an alternative automatic stopping profile if no adjacent permission zone is assigned to the vehicle while it traverses the permission zone. This level of guidance supervision is in addition to and independent of the safety and other constraints imposed by the control system that causes the vehicle to track a predetermined trajectory. For example, the guidance system may also assign and implement a travel speed for each autonomous vehicle in conventional manner for each segment of trajectory being traversed and such speed will be maintained, independent of its magnitude, so long as it does not exceed the profile superimposed by the applicable permission zone. As the vehicle approaches the portion of its trajectory that is near the end of the current permission zone being traversed, the vehicle will maintain the speed assigned by the guidance system at its maximum level if another, adjacent permission zone has been activated for the vehicle in question; if not, the vehicle's speed will be adjusted to conform to the applicable stopping profile imposed by the permission zone (such as 64 in FIG. 10, for example) until a new permission is granted, regardless of the speed imposed by the vehicle guidance system as a function of the trajectory in question. Thus, in essence, the permission zone approach of the invention provides an additional, independent mechanism through which exclusive vehicle presence and maximum safe speeds are guaranteed irrespective of the constraints and guidance controls imposed by the trajectory-tracking system.

Since each autonomous vehicle in a guided system is necessarily equipped with a two-way communication unit, each vehicle is linked to every other vehicle in the system, either directly, through a central location, or via a network of routers between the various vehicles. Accordingly, if each vehicle periodically broadcasts its position, a central computer or the vehicle's on-board data processor can monitor the position of every other vehicle, identify intersecting trajectories, and control the flow of traffic through the assignment of active permission zones to prevent collisions with other vehicles or any other known obstacle. It is noted that the traffic of manned vehicles within the system can be similarly regulated with the permission concept of the invention. The only difference between a manned and an unmanned vehicle is the fact that pertinent sets of instructions are implemented manually rather than by means of automated systems.

According to another aspect of the invention, permissions may be assigned with attached conditions designed to further expedite traffic. For example, when two vehicles A and B are approaching an intersection, each could be assigned a permission for the same zone but conditioned upon reaching a certain point along its trajectory before the other vehicle reaches another certain point along its own trajectory. The permission will ultimately be assigned unconditionally to only one vehicle after one of the conditions is met.

In the preferred method of the invention, active permission zones are created and assigned by a central computer in communication with all vehicles on the property and remain valid until relinquished by the vehicle to which they have been assigned. Permission zones are assigned to vehicles, with or without conditions, with identification insignia tying them to a particular vehicle. Finally, active permission zones are always assigned unconditionally and never overlap with active permissions zones assigned to another vehicle.

Figure 15:
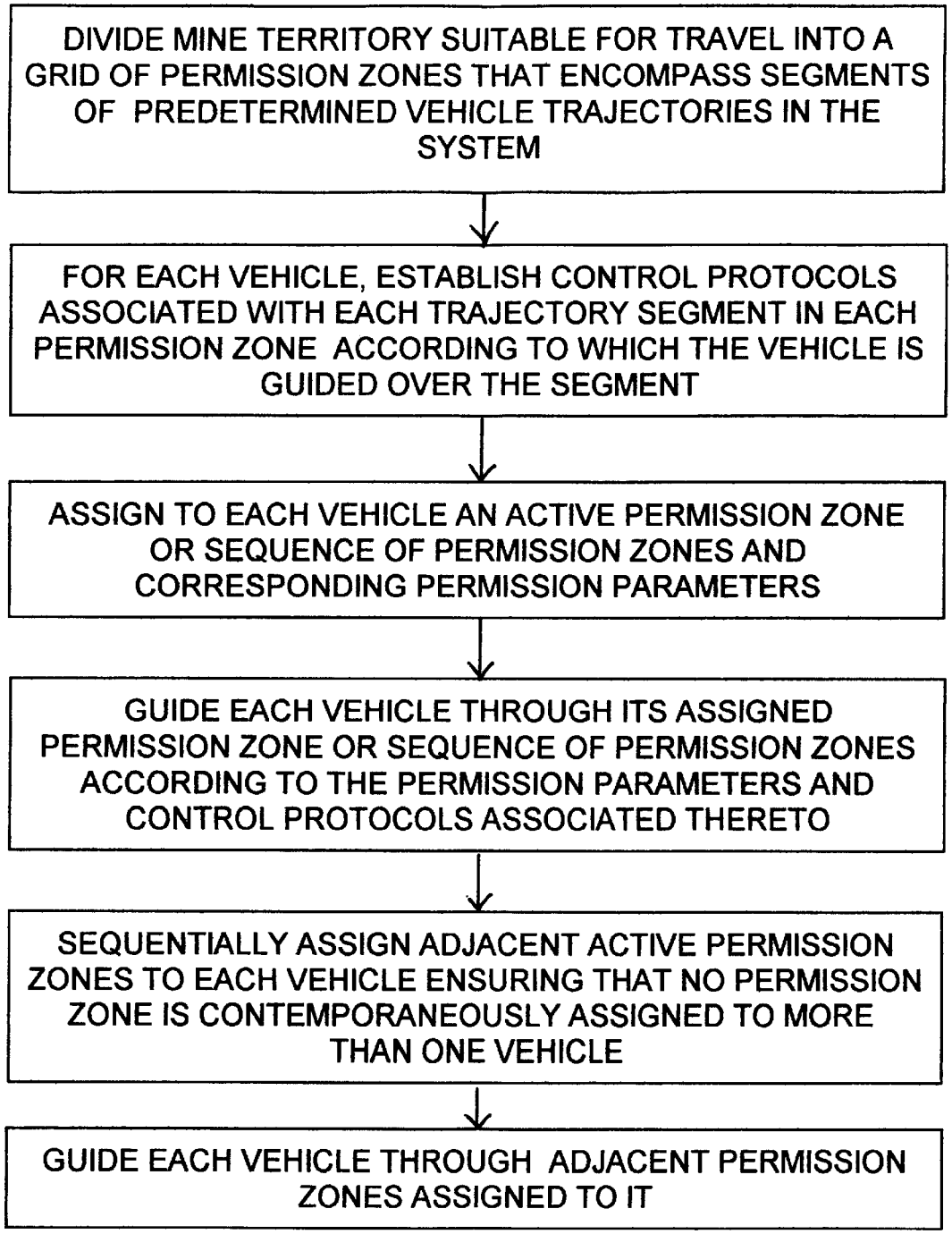
FIG. 15 is a flow chart showing the steps of the invention.

As stated above, the invention is only one feature of a comprehensive collision-avoidance system applied to a guidance system for autonomous vehicles in a surface operation that may also include manned vehicles. The specific features of the collision avoidance and the guidance systems are not part of the invention and, therefore, are not described here. In practice, the invention is implemented within an existing autonomous system as illustrated in the flow chart of FIG. 15. Each course available for travel by the vehicles in the system's territory is divided into discrete area components that encompass pre-existing segments of travel trajectories and sites where new trajectories may be developed. For each such area component and each vehicle, a permission zone or zones and related control protocols according to which the vehicle is authorized to travel are established. Each vehicle is assigned a permission zone or sequence of zones corresponding to the segment of trajectory that includes the vehicle's current position and additional segments to be traversed along the vehicle's course. The vehicle is initially guided through that permission zone (or zones) according to the control protocol associated with it and the additional control constraints imposed by the guidance system. As traffic progresses, adjacent permission zones are sequentially assigned to the vehicle and activated as they become available, and the vehicle is guided through these adjacent permission zones according to corresponding control protocols ensuring that no active permission zone is assigned contemporaneously to more than one vehicle. As a vehicle is traveling along a trajectory, a previously assigned active permission zone may be temporarily relinquished and assigned to another vehicle in order to optimize traffic flow, thereby providing a dynamic system of traffic control. The system is updated periodically as mine development evolves to reflect new travel courses and changed circumstances. For example, it may become appropriate to change routes, trajectories, velocity profiles and/or control protocols, or the size and/or shape of permission zones. Accordingly, the method of the invention provides a dynamic way to continuously optimize the flow of traffic in a mine.

When a vehicle is assigned a permission zone that does not contain a segment of pre-existing trajectory, the system's guidance software can be used to develop a trajectory, according to conventional methods, so that a particular task at hand can be accomplished. For example, if a new area of operation is opened up for a mining shovel, a permission zone covering that area would be assigned to a truck so that it could reach the shovel for loading ore. Since that operation requires maneuvering within the loading zone, new travel trajectories for the truck would have to be developed within the permission zone before the truck could operate there. So, the guidance system would compute a preferred trajectory for the task within the zone based on the expected position of the shovel and the nearest pre-existing trajectories already available, using conventional modeling techniques already built into the system and using the same predetermined constraints imposed elsewhere. Multiple alternative trajectories could similarly be computed and an optimal one selected according to any arbitrary objective function. In any event, according to the invention the truck would be able to operate autonomously within the permission zone without interference from the system other to the extent the guidance system imposes guidance controls while governing the truck's motion over designated travel trajectories.

Figure 16:
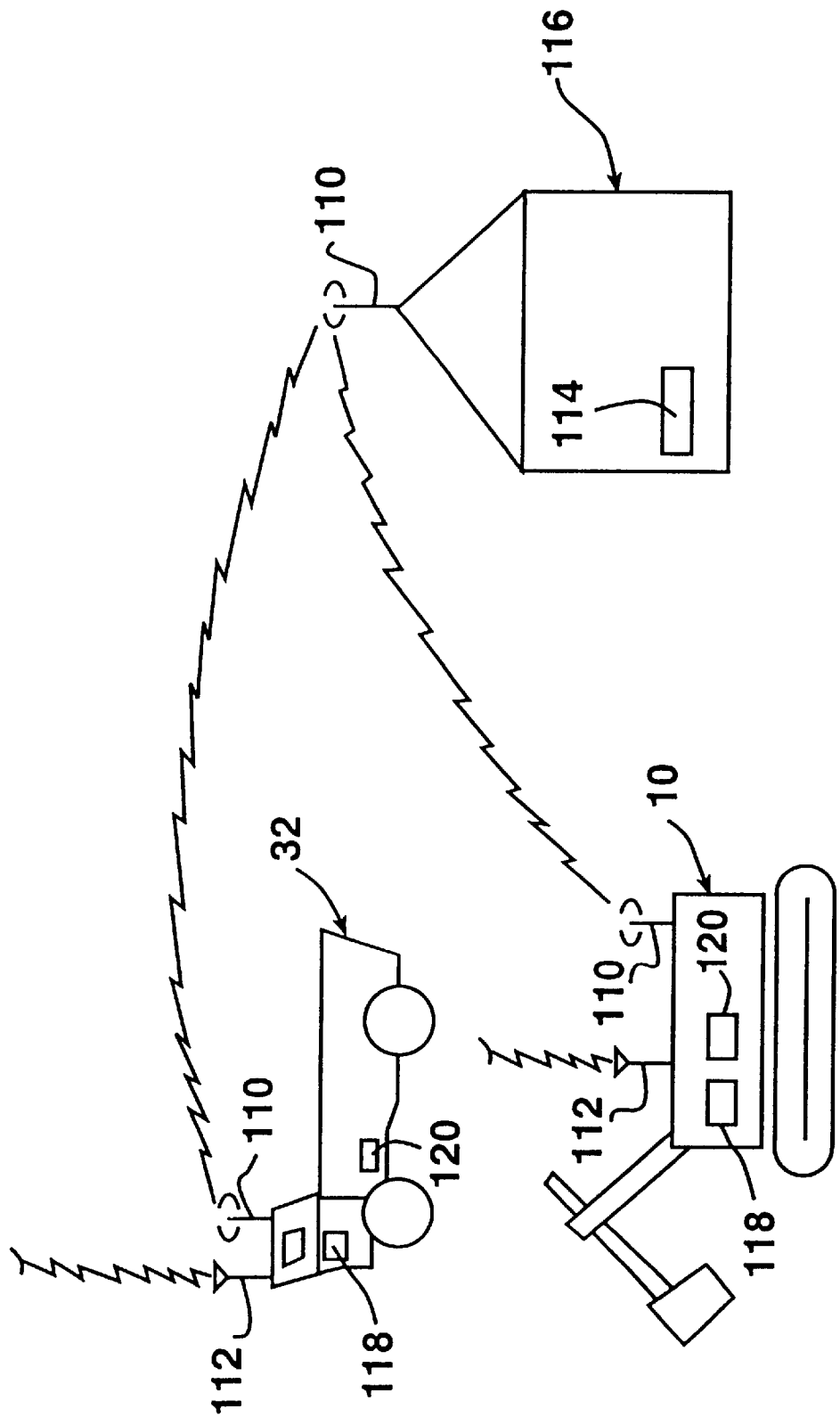
FIG. 16 is a schematic illustration of the apparatus required to implement the invention.

FIG. 16 is a schematic illustration of the apparatus required to implement the permission system of the invention for autonomous-vehicle traffic control. Each excavator 10 and haulage vehicle 32 within the system is equipped with two-way communication apparatus 110 and with a positioning system unit 112 (such as a GPS unit). Mine roadway maps and vehicle trajectories, as well as appropriate software to implement the various functions required for the invention, are stored in digital form in a computer 114 (or, equivalently, in a unit of a computer network) housed in a base station 116 which is also equipped with two-way communication apparatus 110. Thus, the precise location of the vehicle 32 can be determined periodically, using its positioning system unit and an on-board processor 118 (with appropriate hardware, software and control modules 120), and communicated to the computer 114 at the base station together with identifying information regarding the particular vehicle 32 being guided. Upon processing of this information, the computer 114 transmits the appropriate set of instructions to the on-board processor 118 to guide the vehicle to the intended destination using appropriate hardware and guidance software incorporated within the vehicle. The control mechanisms and related processing hardware and software required to implement the various steps of the invention are well known in the art.

Various changes in the details, steps and components that have been described may be made by those skilled in the art within the principles and scope of the invention herein illustrated and defined in the appended claims. Therefore, while the present invention has been shown and described herein in what is believed to be the most practical and preferred embodiments, it is recognized that departures can be made therefrom within the scope of the invention, which is not to be limited to the details disclosed herein but is to be accorded the full scope of the claims so as to embrace any and all equivalent apparatus and procedures.

We claim:

1. In a system wherein traffic-control apparatus guides a plurality of autonomous vehicles to move along travel trajectories according to predetermined guidance-control parameters, a method for preventing collisions among the vehicles comprising the steps of:

(a) for each travel trajectory and for each vehicle, establishing said guidance-control parameters corresponding to said travel trajectory according to which the vehicle is constrained in its travel over the travel trajectory;

(b) establishing a territorial grid of permission zones encompassing segments of said travel trajectories;

(c) establishing control protocols associated with each of said permission zones according to which the vehicle is authorized to travel through each of said permission zones;

(d) assigning to the vehicle an active permission zone or a sequence of active permission zones corresponding to a segment of travel trajectory that includes the vehicle's current position;

(e) guiding the vehicle through said active permission zone or sequence of active permission zones according to the control protocols associated thereto and the guidance-control parameters corresponding to said travel trajectory; and (f) sequentially assigning adjacent active permission zones to the vehicle and guiding the vehicle through said active adjacent permission zones according to the control protocols associated thereto and the guidance-control parameters corresponding to the travel trajectory;

wherein no active permission zone is assigned contemporaneously to more than one vehicle.

2. The method of claim 1, wherein said guidance-control parameters include maximum speeds associated with each of said segments of travel trajectory; said control protocols include a maximum velocity profile for the vehicle corresponding to the active permission zone or sequence of permission zones being traveled by the vehicle; said maximum velocity profile further includes a terminal portion forcing the vehicle to stop prior to exiting the active permission zone or sequence of active permission zones; and said maximum velocity profile is used to override, if necessary, the maximum speeds associated with each of said segments of travel trajectory.

3. The method of claim 2, wherein said terminal portion of the velocity profile is modified to permit travel past the active permission zone or sequence of active permission zones when an adjacent active permission zone is assigned to the vehicle.

4. The method of claim 3, wherein said permission zones have variable sizes selected to produce optimal traffic flow.

5. The method of claim 1, wherein said permission zones have variable sizes selected to produce optimal traffic flow.

6. The method of claim 2, wherein said permission zones have variable sizes selected to produce optimal traffic flow.

7. In a system wherein traffic-control apparatus guides a plurality of vehicles moving along predetermined travel trajectories, apparatus for preventing collisions among the vehicles comprising the following components:

(a) means for establishing for each vehicle guidance-control parameters corresponding to each travel trajectory according to which the vehicle is authorized to travel over the travel trajectory;

(b) means for establishing a territorial grid of permission zones encompassing segments of said travel trajectories;

(c) means for establishing and implementing control protocols associated with each of said permission zones according to which the vehicle is authorized to travel through each of said permission zones;

(d) means for assigning to the vehicle an active permission zone or a sequence of active permission zones corresponding to a travel trajectory that includes the vehicle's current position;

(e) means for guiding the vehicle through said active permission zone or sequence of active permission zones according to the control protocols associated thereto and the guidance-control parameters corresponding to said travel trajectory; and (f) means for sequentially assigning active adjacent permission zones to the vehicle and guiding the vehicle through said active adjacent permission zones according to the control protocols associated thereto and the guidance-control parameters corresponding to the travel trajectory;

wherein no active permission zone is assigned contemporaneously to more than one vehicle.

8. The apparatus of claim 7, wherein said guidance-control parameters include maximum speeds associated with each of said segments of travel trajectory; said control protocols include a maximum velocity profile for the vehicle corresponding to the active permission zone or sequence of permission zones being traveled by the vehicle; said maximum velocity profile further includes a terminal portion forcing the vehicle to stop prior to exiting the active permission zone or sequence of active permission zones; and said maximum velocity profile is used to override, if necessary, the maximum speeds associated with each of said segments of travel trajectory.

9. The apparatus of claim 8, wherein said terminal portion of the velocity profile is modified to permit travel past the active permission zone or sequence of active permission zones when an adjacent active permission zone is assigned to the vehicle.

10. The apparatus of claim 9, wherein said permission zones have variable sizes selected to produce optimal traffic flow.

11. The apparatus of claim 7, wherein said permission zones have variable sizes selected to produce optimal traffic flow.

12. The apparatus of claim 8, wherein said permission zones have variable sizes selected to produce optimal traffic flow.

* * * * *